(No Model.)
R. S. SINCLAIR.
DEVICE FOR SUSPENDING HAMS, &c.
No. 343,499. Patented June 8, 1886.
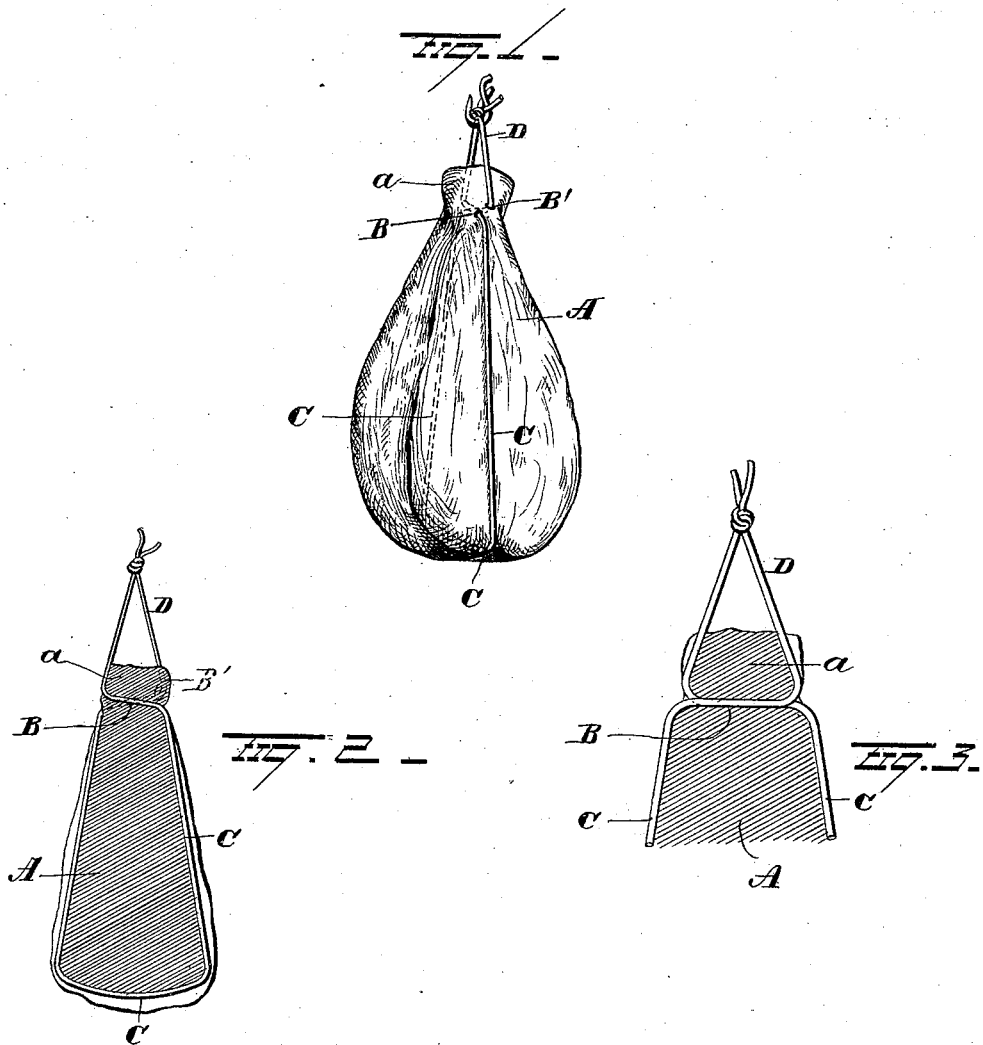
WITNESSES
N. E. Jones
Geo. F. Downing
INVENTOR
Robert S. Sinclair.
By H. A. Seymour.
Attorney

UNITED STATES PATENT OFFICE.

ROBERT SIMMS SINCLAIR, OF INDIANAPOLIS, INDIANA.

DEVICE FOR SUSPENDING HAMS, &c.

SPECIFICATION forming part of Letters Patent No. 343,499, dated June 8, 1886.

Application filed April 9, 1886. Serial No. 198,337. (No model.)

*To all whom it may concern:*

Be it known that I, ROBERT SIMMS SINCLAIR, of Indianapolis, in the county of Marion and State of Indiana, have invented certain new and useful Improvements in Devices for Suspending Hams, &c.; and I do hereby declare the following to be a full, clear, and exact description of the invention, such as will enable others skilled in the art to which it appertains to make and use the same.

My invention relates to an improvement in devices for suspending hams, &c.

Hitherto pork hams, shoulders, and joints prepared for market have been provided with a piece of rope, yarn, or other cord passed through a hole in the shank and formed in a loop, for the purpose of suspending the ham and allowing a free circulation of air around it. Hams, shoulders, and joints thus prepared have had a tendency to sag out of shape, the meat, which is thick and heavy, compared with the small bone therein, having loosened from the bone and left crevices large enough to admit the small fly which blows the meat, and causes the loss of the ham by the breeding of maggots therein.

The object of my present invention is to provide hams, shoulders, and joints for market, which may be hung up without danger of sagging out of shape and without danger of loosening the meat from the bone.

With these ends in view my invention consists in certain features of construction and combinations of parts, as will be hereinafter described, and pointed out in the claim.

In the accompanying drawings, Figure 1 is a view of the prepared ham suspended from a hook, and Fig. 2 is a vertical section showing position of cord. Fig. 3 represents a modification.

A represents the body of the ham, and *a* the shank. Two perforations, B B', are formed through the shank from inside or meat side to outside or rind side. A rope or cord, C, (wire might possibly be used, or a flat metallic band,) is passed around the body of the ham with the lower bight of the loop under the lower end of the ham, shoulder, or joint. The parts of the loop extend up the inside and outside of the body A, preferably about the middle of the sides, and cross each other, one part extending from the inside through the perforation B to the outside and the other extending from the outside through the perforation B' to the inside. From thence they extend upwardly on opposite sides of the shank and the ends are united at a point a convenient distance above the shank to form a loop, D, for example, adapted to slip over the end of a hook or peg, from which the ham is to be suspended. As the weight of the ham is taken by the cord or its equivalent, the two parts of the loop around the body of the ham, shoulder, or joint are drawn toward each other, and the meat thereby held snugly in contact with the bone and the ham held in a rounded compact form.

In the modification shown in Fig. 3 the two parts of the cord cross each other in a single perforation in the shank, instead of two separate perforations.

Having fully described my invention, what I claim as new, and desire to secure by Letters Patent, is—

A device for preserving the form of a ham, shoulder, or joint, consisting of a cord or rope, or their equivalent, extending around the body of the ham, shoulder, or joint, the bight of the cord being located beneath the body, and the parts of the cord crossing each other in the shank, and terminating in a loop above the shank, substantially as set forth.

In testimony whereof I have signed this specification in presence of two subscribing witnesses.

ROBERT SIMMS SINCLAIR.

Witnesses:
JOHN FERGUSON,
JOHN MONK.